United States Patent
Achour et al.

(10) Patent No.: US 6,463,283 B2
(45) Date of Patent: *Oct. 8, 2002

(54) SYSTEM AND METHOD FOR SELECTING A VOICE SERVICE OPTION

(75) Inventors: Baaziz Achour, San Diego; Jan C. Ault, Santee; Jun Wang, San Diego, all of CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,628

(22) Filed: Aug. 20, 2001

(65) Prior Publication Data

US 2001/0053693 A1 Dec. 20, 2001

Related U.S. Application Data

(63) Continuation of application No. 09/425,869, filed on Oct. 22, 1999, now Pat. No. 6,321,085.

(51) Int. Cl.[7] .................................................. H04B 7/00
(52) U.S. Cl. ........................................................ 455/432
(58) Field of Search ................................. 455/426, 432, 455/433, 434, 435, 445, 458, 550, 575

(56) References Cited

U.S. PATENT DOCUMENTS 6,321,085 B1 * 11/2001 Achour et al. .............. 455/432

* cited by examiner

Primary Examiner—Thanh Cong Le
(74) Attorney, Agent, or Firm—Philip R. Wadsworth; Charles D. Brown; Howard H. Seo

(57) ABSTRACT

A subscriber unit that supports more than one voice service option and selects the appropriate voice service option when originating and receiving a call. The subscriber unit includes a memory to store parameter values, including a first voice service option parameter value and a second voice service option parameter value. The subscriber unit also includes a means for determining whether the subscriber unit is within a home system or is roaming, and a selecting means for selecting from among at least a first voice service option corresponding to the first voice service option parameter value and a second voice service option corresponding to the second voice service option parameter value. The selecting means selects the first voice service option if the subscriber unit is within the home system, and selects the second voice service option if the subscriber is roaming.

7 Claims, 4 Drawing Sheets

SYSTEM AND METHOD FOR SELECTING A VOICE SERVICE OPTION

BACKGROUND OF THE INVENTION

Related Applications

This application is a continuation of U.S. patent application No. 09/425,869, filed Oct. 22, 1999, now U.S. Pat. No. 6,321,085.

FIELD OF THE INVENTION

The present invention generally relates to wireless communications, and more specifically to a wireless portable telephone that selects a single voice service option from among a plurality of voice service options supported by the portable phone.

RELATED ART

Wireless portable and mobile telephones have become commonplace as an accepted addition to or replacement for conventional landline telephone systems. Wireless portable or mobile telephones offer the convenience of wireless communications from almost any location in the country or the world.

Wireless telephones, which include both satellite and cellular phones, are communications devices that function in a wireless environment. There are three basic types of wireless telephones. Portable phones are typically small, handheld devices that can be carried on the person. Mobile phones are typically mounted in a vehicle; they have a base unit or cradle that is fixedly mounted to the vehicle, usually inside the passenger compartment, and a handset that is connected to the base unit or cradle by a wire. A fixed wireless phone is usually mounted in a single location. Any of these types of phones can be operated over a terrestrial cellular network or over a satellite communications network. Some wireless phones are capable of operating over both cellular and satellite systems.

Wired phones are those connected directly to a wireline phone system by wires. Wired phones are the typical standard phones found in what is called POTS (Plain Old Telephone Systems). Telephones that operate over short range wireless links, such as portable phones that are used in the home or small business environment, and which transmit to and receive signals from a single fixed base station or unit over a short range (for example, several hundred to a thousand meters), where the base unit is directly connected to a wireline communications network, are not considered wireless phones for purposes of this disclosure. Such single station, short range wireless phones are called "cordless phones" and are considered to fall in the category of standard wireline phones (that is, phones connected to the communications network by wires).

In any given geographic region there may be a number of wireless telephone service providers, each operating their own wireless telephone network, which may cover an entire country or just a region. Each wireless telephone service provider may support different voice service options. For example, in a code division multiple access (CDMA) cellular telephone network, the voice service options can include an IS-96-A voice service option (hereafter "8K voice service option"), an IS-733 voice service option (hereafter "13K voice service option"), and an IS-127 voice service option (hereafter "EVRC voice service option"). Each of the foregoing IS specifications is available from the Telecommunication Industry Association (2001 Pennsylvania Avenue, Suite 800, Washington, DC 20006). Today, the EVRC voice service option is the preferred voice service option because of its high quality and low bandwidth.

Problems arise when not all of the service providers support the same voice service options. For example, if service provider Y offers the EVRC voice service option, but service provider X does not, then when a customer of Y travels into X's region, the customer may not be able to make or receive phone calls. This will be the case when the customer's wireless phone is configured for the EVRC voice service option and X's network does not support voice service option negotiation.

What is desired, therefore, is a subscriber unit that supports multiple voice service options and can intelligently select a voice service option when originating and receiving a call.

SUMMARY OF THE INVENTION

The present invention provides a system and method for selecting a voice service option for a wireless communication device.

In one aspect, the invention provides a subscriber unit that supports more than one voice service option and selects the appropriate voice service option when originating and receiving a call. The subscriber unit includes a memory to store parameter values, including a first voice service option parameter value and a second voice service option parameter value. The subscriber unit also includes a means for determining whether the subscriber unit is within a home system or is roaming, and a selecting means for selecting a voice service option from among at least a first voice service option corresponding to the first voice service option parameter value and a second voice service option corresponding to the second voice service option parameter value. The selecting means selects the first voice service option if the subscriber unit is within the home system, and selects the second voice service option if the subscriber is roaming. Typically, the first voice service option is different from the second voice service option.

Advantageously, the selecting means includes means for creating a call request message, wherein the call request message includes a voice service option field for storing a voice service option value, means for placing the first voice service option parameter value in the voice service option field when the subscriber unit is in a home system, means for placing the second voice service option parameter value in the voice service option field when the subscriber unit is roaming, and means for transmitting the call request message.

Preferably, a third voice service option parameter value is also stored in the non-volatile memory. Additionally, the selecting means also includes means for creating a page response message, wherein the page response message includes a voice service option field for storing a voice service option value, means for placing the third voice service option parameter value in the voice service option field when the subscriber unit is in a home system, and means for transmitting the page response message.

In another aspect, the invention provides a method for a subscriber unit to select a voice service option when originating a call, where the subscriber unit includes a memory that stores a first voice service option value and a second voice service option value. In one embodiment, the method includes the steps of determining whether the subscriber unit is in a home system, and if the subscriber unit is in a home system, retrieving from the memory the first voice service option value. But, if the subscriber unit is not in a home system, the method includes the step of retrieving from the memory the second voice service option value. The method also includes the steps of creating a call request message having a voice service option field, storing in the voice service option field the voice service option value retrieved from the non-volatile memory, and transmitting the call request message to initiate the call.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

A system and method for selecting a voice service option in a wireless communication system is provided. In the following description various procedures, arrangements, and systems are described in detail. This includes the description of a cellular telephone system operating in accordance with a particular code division multiple access (CDMA) cellular telephone specification and protocol. It will be apparent to one skilled in the art that the present invention may be practiced within a variety of wireless communication systems, although the described embodiment is preferred. Well known structures and systems are provided in block form. This is done in order to avoid unnecessarily obscuring the disclosure of the present invention.

Figure 1:
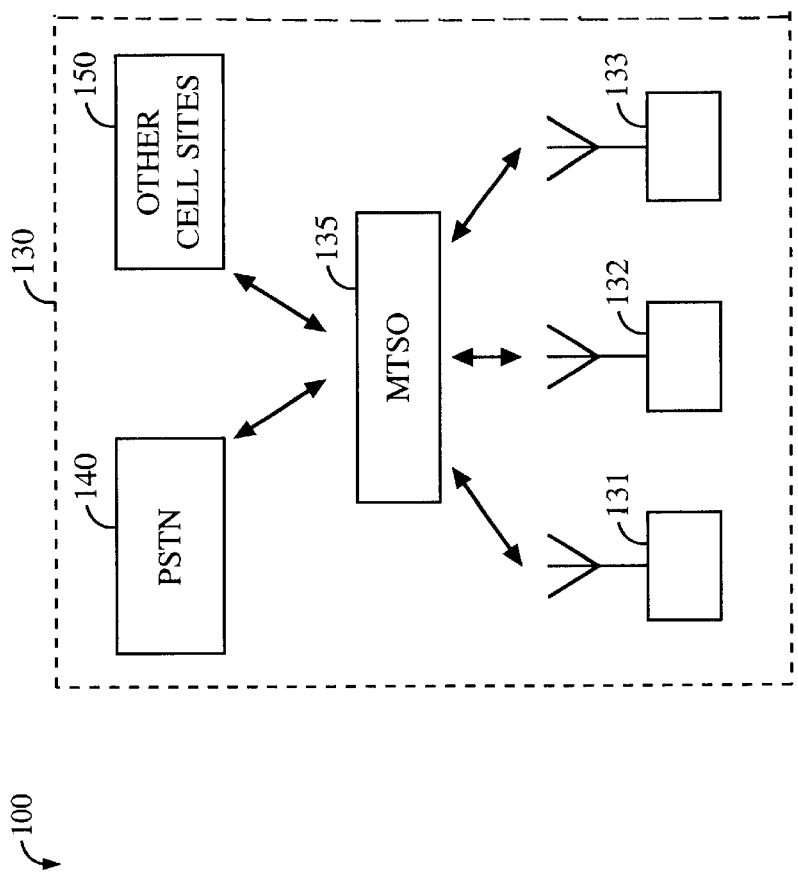
FIG. 1 is an illustration of a cellular telephone system configured in a manner consistent with the use of CDMA radio wave modulation techniques.
Figure 1:
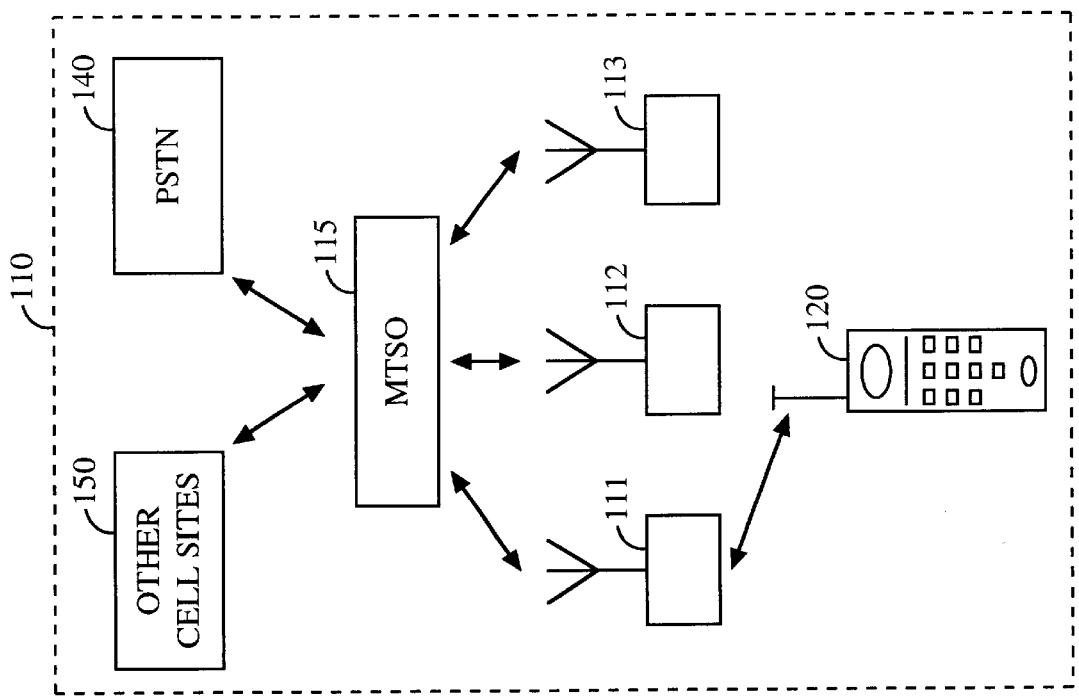

FIG. 1 is an illustration of a cellular telephone system 100 configured in a manner consistent with the use of CDMA radio wave modulation techniques. One implementation for such a CDMA cellular telephone system is described in U.S. Pat. No. 4,901,307 ('307) entitled "Spread Spectrum Multiple Access Communication System Using a Satellite or Terrestrial Repeater" and in U.S. Pat. No. 5,103,459 ('459) entitled "System and Method for Generating Signal Waveforms in a CDMA Cellular Telephone System," both assigned to the assignee of the present invention, the disclosures of which are incorporated herein by reference. Additionally, an implementation for a CDMA cellular telephone system is described in specification IS-95 entitled "Mobile Station-Base Station Compatibility Standard for Dual Mode Wideband Spread Spectrum Cellular System" (IS-95), which is also incorporated herein by reference. The IS-95 specification is available from the Telecommunication Industry Association (2001 Pennsylvania Avenue, Suite 800, Washington, D.C. 20006).

Cellular telephone system 100 is shown as including two cellular telephone networks 110 and 130. Cellular telephone network 110 is operated by service provider X, and cellular telephone network 130 is operated by service provider Y.

Network 110 includes base stations 111, 112, and 113, and a mobile telephone switching office (MTSO) 115. Similarly, network 130 includes base stations 131, 132, and 133, and a MTSO 135. Base stations 111, 112, and 113 receive radio frequency (RF) signals from and transmit RF signals to subscriber unit 120. Likewise, base stations 131, 132, and 133 receive RF signals from and transmit RF signals to other subscriber units (not shown). Preferably, base stations 111, 112, 113, 131, 132, and 133 transmit and receive RF signals that are modulated in accordance with the CDMA spread spectrum techniques described in the above referenced '459 and '307 patents and IS-95 specification.

Base stations 111, 112, and 113 communicate with MTSO 130 in a variety of ways, including ground based wires or microwave links. MTSO 130 routes traffic it receives from base stations 111, 112, and 113 to public switched telephone network (PSTN) 140 or to other cell sites 150.

When a subscriber desires to place a call, the subscriber first activates (that is, powers on) subscriber unit 120. Upon being activated, subscriber unit 120 will register with the network within whose service area subscriber unit 120 is physically located. In the example shown in FIG. 1, subscriber unit 120 will register with network 110. During the registration process, network 110 transmits a system identifier (SID) to subscriber unit 120. Each network, such as network 110 and 130, has associated with it a unique SID. The SID transmitted to subscriber unit 120 enables subscriber unit 120 to identify the network with which it is communicating.

After the registration process is completed and after the subscriber enters the phone number of the phone to be called, subscriber unit 120 transmits a call request message to network 110. A voice service option (VSO) number is contained in the call request message. The VSO number identifies the voice service option that subscriber unit 120 is requesting. Subscriber unit 120 may support two or more voice service options, and thus could potentially request any one of them. Network 110, however, may or may not support the voice service option requested by subscriber unit 120, and thus may not recognize the VSO number contained in the call request message. If network 110 does not recognize the VSO number and network 110 does not support service negotiation, then network 110 rejects the call request message. In this case, subscriber unit 120 will not be given a channel to complete the call and the call will be dropped.

The present invention aims to overcome this problem that arises when a subscriber unit, such as subscriber unit 120, supports voice service options that may not be supported by all networks. According to one embodiment of the present invention, subscriber unit 120 is programmed to select which VSO number to use based on whether subscriber unit 120 is within its home network or is roaming and based on whether subscriber unit 120 is originating the call or receiving a call.

Figure 2:
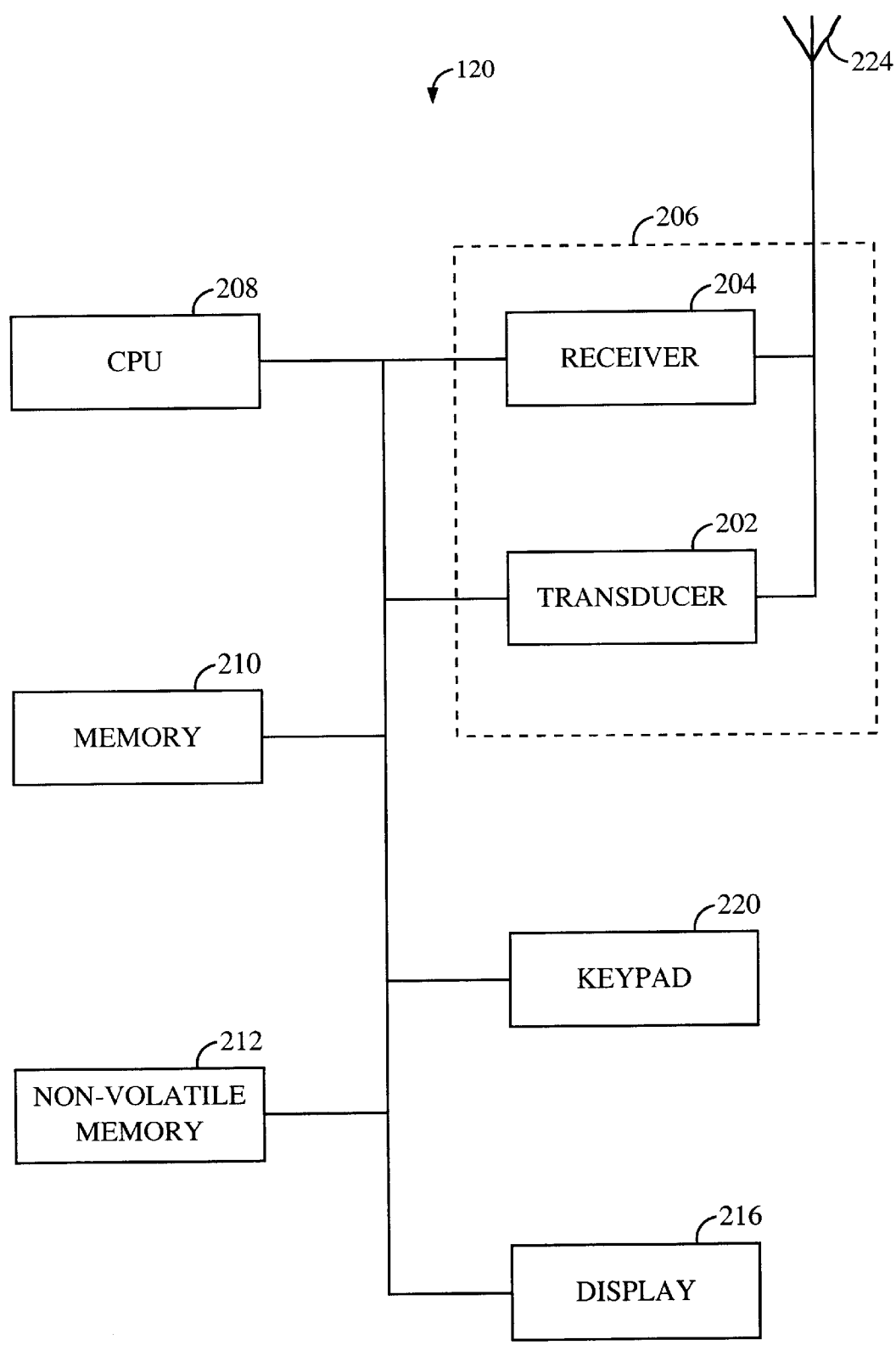
FIG. 2 is a functional block diagram of a subscriber unit according to one embodiment of the present invention.

The present invention is embodied in subscriber unit 120, which is illustrated in the functional block diagram of FIG. 2. Subscriber unit 120 includes many components found in conventional subscriber units. For example, subscriber unit 120 includes a display 216, keypad 220, and antenna 224. For the sake of clarity, other conventional components, such as a speaker, a microphone, and battery are omitted from FIG. 2. However, those skilled in the art will recognize that subscriber unit 120 includes these conventional components. Subscriber unit 120 also includes a transmitter 202 and a receiver 204 coupled to antenna 224. Transmitter 202 transmits voice and digital data from the subscriber unit 120 to a base station (see FIG. 1). Similarly, receiver 204 receives voice and data from a base station. Transmitter 202 and receiver 204 may also be combined to form a transceiver 206.

Subscriber unit 120 also includes a bus 207 and a central processing unit (CPU) 208, which may be a conventional microprocessor, micro-controller or the like, interfaced to bus 207. Subscriber unit 120 also includes a memory 210 interfaced to bus 207. Memory 210 may include both read-only memory (ROM) and random access memory (RAM). Computer instructions within the ROM portion of memory 210 are executed by CPU 208 to control operation of subscriber unit 120. Thus, instructions executed by CPU 208 control normal operation of subscriber unit 120 as well as the VSO selection features of the present invention.

Additionally, there is included a non-volatile memory 212 interfaced to bus 207. Non-volatile memory 212 is used to store parameter values. A number of parameters are used to operate subscriber unit 120. For purposes of the present invention, these parameters are divided into three different categories. The first category is defined herein as operational parameters. Examples of operational parameters are user-programmable features such as programmed telephone numbers, speed dialing features, call forwarding, and the like. Typically, a user of subscriber unit 120 stores operational parameters into non-volatile memory 212 by manipulating keypad 220.

A second category of parameters, defined herein as system parameters, are programmed into subscriber unit 120 to control the communications between subscriber unit 120 and base stations (see FIG. 1). Examples of system parameters include an electronic serial number (ESN), a mobile identification number (MIN), and a home system identification number (HSID). The ESN and MIN are transmitted from subscriber unit 120 to a base station to identify the subscriber unit for billing purposes and to verify the authenticity of the subscriber unit. The H_SID is used by CPU 208 to determine whether subscriber unit 120 is within a home system or roaming. As described above, when subscriber unit 120 registers with a network, the network transmits a system identification number (SID) to subscriber unit 120. CPU 208 compares the H_SID stored in non-volatile memory 212 to the SID transmitted from the network. If the SID matches the H_SID, then the network is the "home" network for subscriber unit 120, otherwise the network is a "roaming" network and the subscriber unit 120 is said to be "roaming."

The third category of parameters is defined herein as voice service option parameters (VSOP). In one embodiment, there are at least three VSOP values stored in non-volatile memory 212. The first is defined herein as the home origination VSOP (HO_VSOP). The second is defined herein as the home termination VSOP (HT_VSOP). The third category is defined herein as the roam origination VSOP (RO_VSOP). These three VSOPs allow subscriber unit 120 to request one voice service option when unit 120 is within a home network and to request a different voice service option when roaming. This is particularly useful when subscriber unit 120's home network supports a voice service option that is not supported by other networks.

It should be noted that any voice service option number that is supported by subscriber unit 120 can be stored as the HO_VSOP, HT_VSOP, and RO_VSOP. In one embodiment the HO_VSOP and the HT_VSOP values are set to the voice service option number associated with the EVRC voice service option, and the RO_VSOP value is set to the voice service option number associated with the 13 K voice service option. In a second embodiment, the HO_VSOP, the HT_VSOP, and the RO_VSOP values are all set to the voice service option number associated with the EVRC voice service option. Additionally, in a third embodiment, the HT_VSOP parameter is not initialized to any voice service option number. In other words, the HT_VSOP parameter is disabled.

Figure 3:
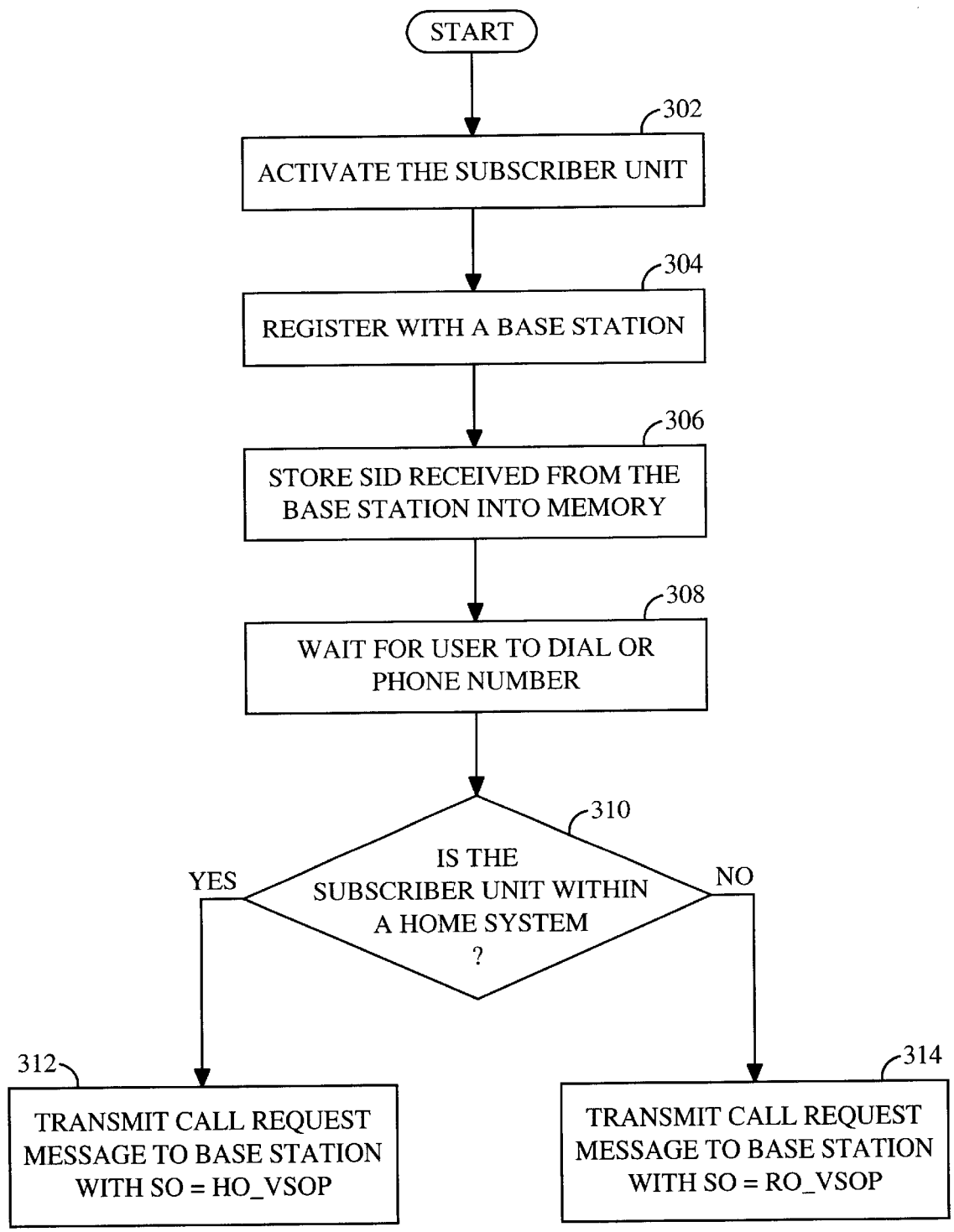
FIG. 3 illustrates a process for selecting the voice service option number to request when a subscriber unit is originating a call.

FIG. 3 illustrates a process for selecting the voice service option number to request when subscriber unit 120 is originating a call. The procedure begins in step 302 where subscriber unit 120 is activated. After being activated, subscriber unit 120 registers with a base station (step 304). As part of the registration process, the base station transmits a SID to subscriber unit 120. Subscriber unit 120 stores the SID in memory 210 (step 306). Subscriber unit 120 then waits for the user to dial a phone number (step 308). After the phone number is dialed and the user activates a send key (not shown) on keypad 220, subscriber unit 120 determines whether it is in its home network or roaming by comparing the SID stored in memory 210 to the H_SID stored in non-volatile memory 212 (step 310).

If subscriber unit 120 is in its home network, subscriber unit 120 transmits a call request message to the base station where the voice service option number specified in the call request message is equal to the HO_VSOP value stored in non-volatile memory 210 (step 312). Otherwise, subscriber unit 120 transmits a call request message to the base station where the voice service option number specified in the call request message is equal to the RO_VSOP value stored in non-volatile memory 210 (step 314). Consequently, the voice service option requested by subscriber unit 120 is dependent on whether subscriber unit 120 is in a home system or roaming.

Figure 4:
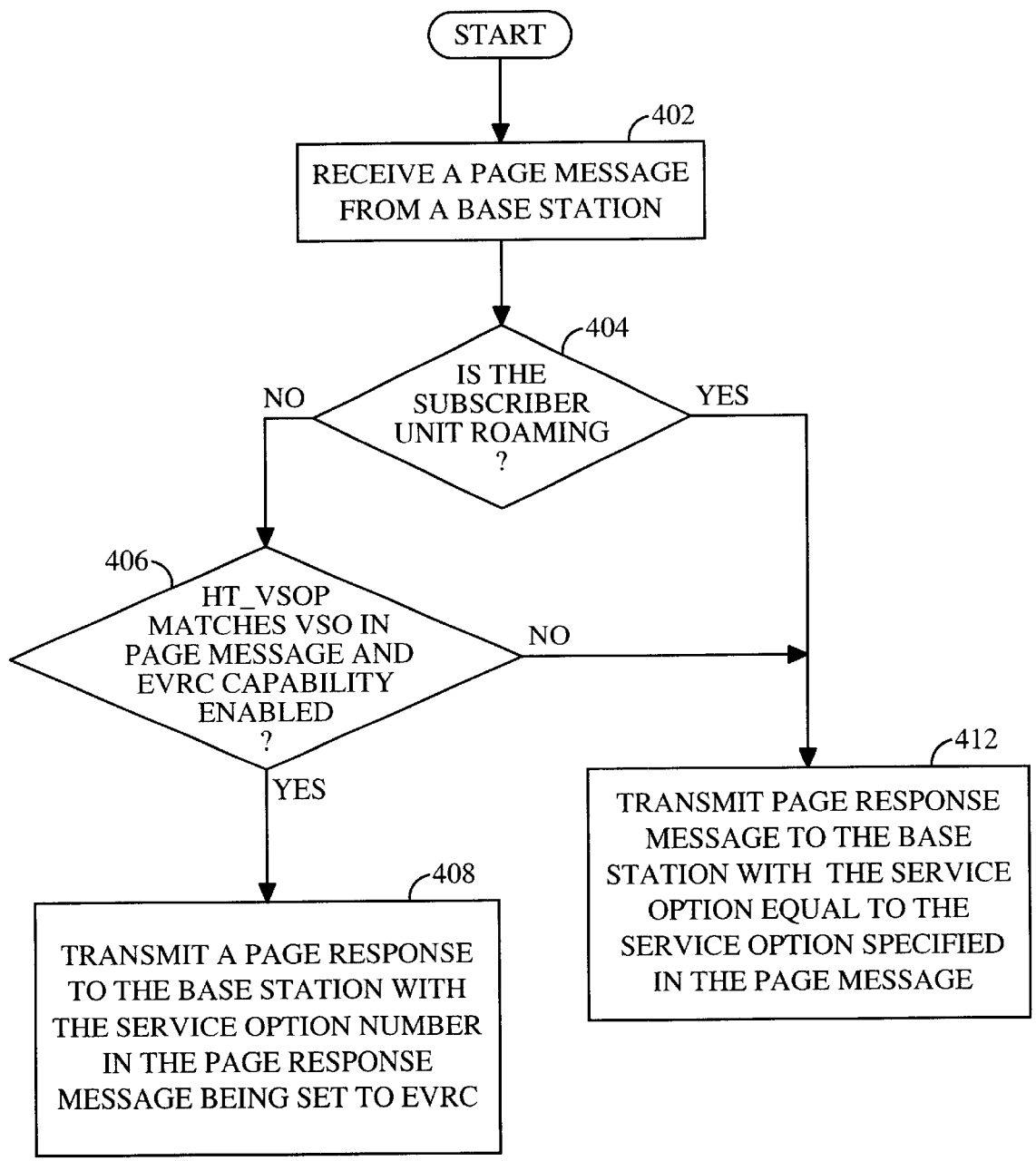
FIG. 4 illustrates a process for selecting the voice service option number to request when a subscriber unit is receiving a call.

FIG. 4 illustrates a procedure for selecting the voice service option number to use when subscriber unit 120 is receiving a call. The procedure begins in step 402 where subscriber unit 120 receives a page message from a base station. A base station sends a page to subscriber unit 120 when there is an incoming call for subscriber unit 120. After receiving the page message, subscriber unit 120 determines whether it is roaming or in its home network (step 404). If subscriber unit 120 is in a home network, control passes to step 406, otherwise control passes to step 412.

In step 406, subscriber unit 102 determines whether the HT_VSOP matches the VSO in the page message and EVRC is enabled. HT_VSOP is the VSO that the subscriber unit looks for in the page message to decide whether to respond with the preferred VSO; in this example, the preferred VSO is EVRC. This gives flexibility to the carriers. For example, if HT_VSOP=8k, the subscriber unit will respond with 13k, if paged with 8k; or EVRC if paged with 8k. However, if HT_VSOP=* (don't care), the subscriber unit will always respond with EVRC, independently of what is contained in the page message (step 408).

If subscriber unit 120 is roaming, or if HT_VSOP does not match the VSO in the page message or EVRC is not enabled, control passes to step 412. In step 412, subscriber unit 102 transmits a page response message to the base station, where the voice service option number contained in the page response message is equal to the voice service option number contained in the page message sent from the base station.

In this manner, subscriber unit 120 can request different voice service options depending on whether it is in a home network or roaming.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What Is claimed Is:

1. A subscriber unit that supports more than one voice service option and selects the appropriate voice service option when originating and receiving a call, comprising:

a memory to store parameter values comprising a first voice service option parameter value and a second voice service option parameter value;

a processor for determining whether the subscriber unit is within a home system or is roaming, wherein said processor selects a first voice service option corresponding to said first voice service option parameter value when the subscriber unit is determined to be within said home system and selects a second voice service option corresponding to said second voice service option parameter value when the subscriber unit is determined to be roaming.

2. The subscriber unit of claim 1, further comprising:

a program memory connected to the processor for storing program instruction steps executed by the processor, wherein the program instruction steps include:

creating a call request message, wherein said call request message includes a voice service option field for storing a voice service option parameter value;

placing said first voice service option parameter value in said voice service option field when the subscriber unit is in a home system;

placing said second voice service option parameter value in said voice service option field when the subscriber unit is roaming; and transmitting said call request message.

3. The subscriber unit of claim 1, wherein said memory further stores a third voice service option parameter value.

4. The subscriber unit of claim 3, wherein said program instruction steps further include:

receiving a page message comprising a voice service option value;

creating a page response message, wherein said page response message includes a voice service option field for storing a voice service option parameter value;

placing said third voice service option parameter value in said voice service option field when the subscriber unit is in a home system; and transmitting said page response message.

5. The subscriber unit of claim 4, wherein said program instruction steps further include:

placing said voice service option value from said page message in said voice service option field when the subscriber unit is roaming.

6. The subscriber unit of claim 1, wherein said first voice service option corresponding to said first voice service option parameter value is an EVRC voice service option.

7. The subscriber unit of claim 6, wherein said second voice service option corresponding to said second voice service option parameter value is a 13K voice service option.

* * * * *